(12) United States Patent
Li et al.

(10) Patent No.: US 10,574,465 B2
(45) Date of Patent: Feb. 25, 2020

(54) ELECTRONIC SUBSCRIBER IDENTITY MODULE (ESIM) ELIGIBILITY CHECKING

(71) Applicant: Apple Inc., Cupertino, CA (US)

(72) Inventors: Li Li, Los Altos, CA (US); Clark P. Mueller, San Jose, CA (US); Avinash Narasimhan, Cupertino, CA (US); Arun G. Mathias, Los Altos, CA (US); David T. Haggerty, San Francisco, CA (US); Najeeb M. Abdulrahiman, Fremont, CA (US); Jean-Marc Padova, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 106 days.

(21) Appl. No.: 15/598,232

(22) Filed: May 17, 2017

(65) Prior Publication Data

US 2017/0338962 A1 Nov. 23, 2017

Related U.S. Application Data

(60) Provisional application No. 62/338,442, filed on May 18, 2016.

(51) Int. Cl.
*H04W 8/18* (2009.01)
*H04L 9/32* (2006.01)
(Continued)

(52) U.S. Cl.
CPC .......... *H04L 9/3247* (2013.01); *H04L 69/326* (2013.01); *H04W 8/18* (2013.01); *H04W 36/0055* (2013.01)

(58) Field of Classification Search
CPC .... H04L 9/3247; H04L 69/326; H04W 8/205; H04W 76/11; H04W 12/06; H04W 8/18; H04W 36/0055
See application file for complete search history.

(56) References Cited

U.S. PATENT DOCUMENTS 7,359,516 B1 4/2008 Skinner et al.
8,442,521 B2 5/2013 Fleischman et al.
(Continued)

OTHER PUBLICATIONS

RSP Architecture; GSM Association; Official Document SGP.21; Version 1.0; Dec. 23, 2015; 52 pgs.
(Continued)

*Primary Examiner* — Jason K Gee
*Assistant Examiner* — Abdullah Almamun
(74) *Attorney, Agent, or Firm* — Dickinson Wright RLLP

(57) ABSTRACT

Embodiments provided herein determine if an electronic subscriber identity module (eSIM) associated with a requested service can be installed in a secure element (SE) housed in a wireless device. Before requesting deployment of an eSIM suitable for the requested service from an eSIM delivery server, a carrier server asks that an original equipment manufacturer (OEM) server validate that an eSIM corresponding to a customer request should be deployed. The OEM server obtains information about the wireless device and information about the SE. When the carrier server requests validation, the OEM server evaluates the wireless device information and/or the SE information. If the OEM server indicates that deployment of the eSIM should proceed, the OEM server also indicates the eSIM type that is compatible with the wireless device and with the SE housed in the device.

20 Claims, 8 Drawing Sheets

(51) Int. Cl.
  *H04L 29/08*  (2006.01)
  *H04W 36/00*  (2009.01)

(56) References Cited

U.S. PATENT DOCUMENTS

| | | | |
|---|---|---|---|
| 8,996,002 B2 | 3/2015 | Rodgers et al. | |
| 2005/0239504 A1 | 10/2005 | Ishii et al. | |
| 2006/0035631 A1 | 2/2006 | White et al. | |
| 2006/0135144 A1 | 6/2006 | Jothipragasam | |
| 2009/0181662 A1 | 7/2009 | Fleischman et al. | |
| 2012/0115441 A1* | 5/2012 | Schell | H04L 63/0853 455/411 |
| 2012/0117635 A1 | 5/2012 | Schell et al. | |
| 2012/0260090 A1* | 10/2012 | Hauck | H04L 63/0853 713/168 |
| 2012/0331292 A1* | 12/2012 | Haggerty | H04L 63/0272 713/168 |
| 2013/0227646 A1* | 8/2013 | Haggerty | H04L 63/0853 726/3 |
| 2015/0289137 A1* | 10/2015 | Yang | H04W 12/06 455/411 |
| 2016/0156607 A1* | 6/2016 | Kim | H04L 63/08 726/7 |
| 2017/0155507 A1* | 6/2017 | Park | H04W 8/18 |
| 2018/0352432 A1* | 12/2018 | Barki | H04L 9/3073 |

OTHER PUBLICATIONS

RSP Technical Specification; GSM Association; Official Document SGP.22; Version 1.0; Jan. 13, 2016; 114 pgs.

* cited by examiner

ELECTRONIC SUBSCRIBER IDENTITY MODULE (ESIM) ELIGIBILITY CHECKING

CROSS-REFERENCE TO RELATED APPLICATION

This application claims benefit of U.S. Provisional Patent Application No. 62/338,442, entitled "ELECTRONIC SUBSCRIBER IDENTITY MODULE (eSIM) ELIGIBILITY CHECKING," filed May 18, 2016, which is hereby incorporated by reference.

FIELD

The described embodiments relate to determining electronic subscriber identity module (eSIM) types suitable for a device.

BACKGROUND

A wireless device can be provisioned with an eSIM. Various network entities participate in provisioning of an eSIM to a secure element (SE), where the SE is hosted by a wireless device. To establish trust between communicating entities, public key infrastructure (PKI) techniques can be used. Problems can arise if an eSIM is deployed to an SE and the eSIM is not compatible with the device and/or the SE.

Aspects of eSIM provisioning include the downloading, installing, enabling, disabling, switching and deleting of a profile on an embedded universal integrated circuit card (eUICC) or universal integrated circuit card (UICC). UICCs and eUICCs are SEs for hosting profiles. A profile is a combination of operator data and applications provisioned on an SE in a device for the purposes of providing services by a wireless operator. A profile can contain one or more secure data used to prove identity and thus verify contract rights to services. During assembly of a device, the eUICC can be inserted into the device.

An eSIM, also referred to herein as a profile, can be identified by a unique number called an ICCID (Integrated Circuit Card Identifier). A wireless operator is a company providing wireless cellular network services. A mobile network operator (MNO) is an entity providing access capability and communication services to its subscribers through a mobile network infrastructure. In some cases, the device is user equipment used in conjunction with an eUICC to connect to a mobile network (also referred to herein as a wireless network). An end user or customer is a person using a (consumer or enterprise) device. An enabled profile can include files and/or applications which are selectable over an eUICC-device interface. A profile is enabled by activating it. Activation includes a wireless operator or MNO recognizing the profile and providing services requested by a device associated with the profile. Whether a profile is suitable for a device and can be enabled may depend on subsidy lock. Subsidy lock is a contract arrangement whereby a wireless carrier sells a device to a user under a contract condition that the user only buys a carrier plan to provide wireless services from the wireless carrier that sold the device.

A digital signature is authentication data that binds the identity of the signer to a data part of a signed message. A certification issuer (CI) is a trusted third party whose signature on a certificate vouches for the authenticity of the public key of the associated user identity.

An architecture framework related to remote provisioning and management of eUICCs in devices is outlined in GSM Association document GSMA SGP.21: "RSP Architecture," Version 1.0 Dec. 23, 2015 (hereinafter "SGP.21").

Remote SIM provisioning of consumer devices is discussed in GSM Association document GSMA SGP.22: "RSP Technical Specification," Version 1.0 Jan. 13, 2016 (hereinafter "SGP.22").

SUMMARY

Representative embodiments set forth herein disclose various systems and techniques for determining an eSIM type that is eligible for a device. In general a device may be a wireless device.

A customer can be irritated if an eSIM is loaded onto their particular device and the eSIM cannot be activated to allow services to be provided. This inability to activate can occur, for example, because the particular device was purchased with a subsidy lock associated with the wireless carrier through whom the particular device was sold, and the eSIM that was load is associated with a different wireless carrier. Such an eSIM is ineligible for the particular device. Another failure mode exists whereby a newly installed eSIM is not compatible with a current operating system version of the SE in the device. These problems are less pronounced with regard to physical SIMs, because when the customer brings the particular device to a wireless carrier retail location to request a SIM, the wireless carrier can easily test if the SIM is compatible. Compatibility with the particular device can be tested by inserting a physical SIM card in the particular device and checking performance.

In the case of installing a new eSIM, the customer may experience frustration, and this is a problem. When an eSIM is assigned and installed on a device; compatibility of the eSIM with the device can be tested. However if the eSIM is not eligible for the device, the eSIM is already installed and wasted. Generally, an eSIM is not transferred from one device to another. The failed eSIM installation also causes an unpleasant customer experience. It is desirable to have a mechanism to perform a policy checking before assigning the eSIM to the customer device.

In embodiments provided herein, a device initiates a session with an OEM server by sending a request, when, for example, a customer indicates a desire to sign up for a wireless carrier plan. An OEM server is, in general, a server operated by a wireless device manufacturer or on behalf of a wireless device manufacturer. A carrier plan is also referred to as contract services herein. The OEM server responds to the request by assigning a random number, for example, a session ID. The session ID, and other device information such as international mobile equipment identity (IMEI), device serial number, mobile equipment identifier (MEID), device version number, operating system version number, are sent to the SE in the device to be cryptographically signed over. The SE signs over a data part including the session ID, device information, and also other SE information (e.g. CSN/EID, a table identifying installed eSIMs, an SE operating system (OS) version number), and returns the data part and the signature as an SE message to the server via the device. The server verifies the signature of the SE and verifies the session ID to make sure that the OEM server is communicating with a legitimate SE. The communications between the device and the OEM server, in some embodiments, are validated using TLS (Transport Layer Security). The OEM server saves the device information and the SE information from the SE message.

The OEM server generates a transaction identifier after authenticating the SE. The transaction identifier is also referred to as a token or a handoff token herein. The OEM server sends the handoff token to the device. The device then redirects the SE message along with the handoff token to a carrier server. The carrier server first looks up the OEM server based on device information. The carrier server then uses the handoff token to query the OEM server for eligibility checking. The carrier server wants the OEM server to inform the carrier server of what type or types of eSIM are eligible, i.e., an eSIM type that can be installed in the device. The OEM server can utilize its own backend server (e.g. based on factory information, and/or shipping information and/or selling channel information) to determine if the device is eligible for the wireless carrier (wireless operator or MNO) indicated by the customer request. A particular wireless carrier may be associated with a particular set of eSIM types.

If an activation policy visible to the OEM server for the requesting device disallows the wireless carrier of the carrier server, then the eligibility check will fail because there is no eligible eSIM type to provide service on the requesting device for that disallowed wireless carrier. In case the check fails, the OEM server will not approve vending an eSIM from an eSIM delivery server to the device. Other logic can also be built into the server, for example, for business rule enforcement.

In case the device is compatible with the wireless carrier, the OEM server determines one or more eSIM types that are eligible for the device. The OEM server provides identifiers of the eligible eSIM types to the carrier server. The carrier server then communicates with an eSIM server, for example, an eSIM delivery SM-DP+, to obtain a suitable eSIM. The eSIM delivery server provides a particular eSIM instance. The wireless carrier activates service for the particular eSIM instance and the device downloads the particular eSIM instance from the eSIM delivery server. The device and the SE then install the particular eSIM instance in the SE and the customer begins to enjoy the services they sought when they made the request. The OEM server and carrier server can also be hosted by trusted third parties.

The activities and messages described above for a device-centered flow also apply to an off-device flow. Off-device means that there is not a dependence on whether the device is powered-up. For example, the carrier serve, in some embodiments, queries the OEM server based on an SE identifier. The SE identifier, in some embodiments, is a CSN. The OEM server bases its response to the query from the carrier server on factory-supplied information, and/or shipping information. The OEM server then proceeds as above to determine one or more eSIM types that are eligible to be provisioned to the device. The carrier server is not involved at this point, so the provided types generally will represent more than one wireless carrier if the device is not under a subsidy lock.

The OEM server also, in some embodiments, relies on business rules to determine an eligible eSIM type. A business rule can stipulate that, if the device is under a subsidy lock, a particular set of eSIM types are eligible for installation on the SE in the device. The particular set of eSIM types, in some embodiments, is associated with the wireless carrier through whom the phone was sold to an end user with the subsidy lock contract provision. The set, in some embodiments, is made up of a single eSIM type.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described will become apparent from the following Detailed Description, Figures, and Claims.

BRIEF DESCRIPTION OF THE DRAWINGS

The included drawings are for illustrative purposes and serve only to provide examples of possible structures and arrangements for the disclosed systems and techniques for intelligently and efficiently managing calls and other communications between multiple associated user devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

DETAILED DESCRIPTION

Figure 1:
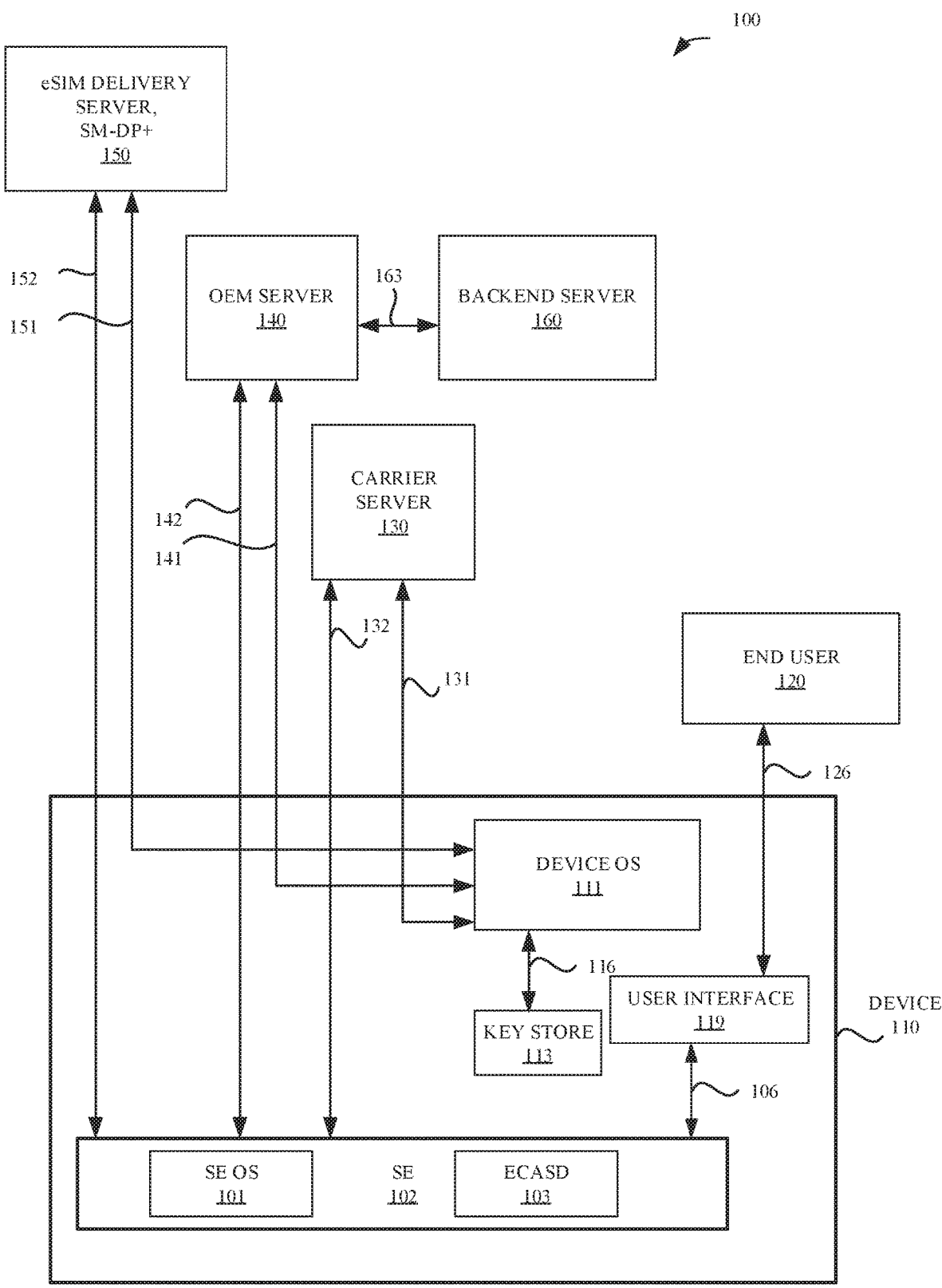
FIG. 1 illustrates an exemplary system for checking the eligibility of an eSIM to be deployed to a device, according to some embodiments.

Representative applications of apparatuses, systems, and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

A wireless device can be provisioned with an eSIM. Various network entities participate in provisioning of an eSIM to a SE, where the SE is hosted by a wireless device. To establish trust between communicating entities, public key infrastructure (PKI) techniques can be used. Problems can arise if an eSIM is deployed to an SE and the eSIM is not compatible with the device and/or with the SE. An eSIM associated with a wireless operator or MNO that does not fit in with a contract under which the wireless device was sold is not a compatible eSIM.

Embodiments disclosed herein avoid these problems by determining if an eSIM should be deployed to a requesting device. If an eSIM should be deployed, in some embodiments, eligible eSIM types are determined and provided to a carrier server. The carrier server then initiates deployment based on the indicated one or more types. Before describing the methods, servers, and devices involved with this solution, eSIM provisioning and PKI techniques will be described to aid in the subsequent discussion.

eSIM Provisioning

A function which provides profile packages is known as a subscription manager data preparation (SM-DP, or SM-DP+). An SM-DP may also be referred to as a profile provider or as an eSIM vendor. An eSIM is an electronic SIM. A physical SIM can be an electronic card, which can be inserted into a wireless device. An eSIM is an example of a profile. A profile package can be a personalized profile using an interoperable description format that is transmitted to an eUICC as the basis for loading and installing a profile. Profile data which is unique to a subscriber, e.g., a phone number or an International Mobile Subscriber Identity (IMSI), are examples of personalization data. The SM-DP communicates over an interface with an eUICC. Certificates used for authentication and confidentiality purposes can be generated by a trusted certificate issuer.

eUICC (SE) Description

Some aspects of an SE will be described here with respect to an eUICC. An eUICC includes an operating system, and the operating system can include ability to provide authentication algorithms to network access applications associated with a given operator. The operating system also can include the ability to translate profile package data into an installed profile using a specific internal format of the eUICC. An ISD-P (issuer security domain—profile) can host a unique profile within an eUICC. The ISD-P is a secure container or security domain for the hosting of the profile. The ISD-P is used for profile download and installation based on a received bound profile package. A bound profile package is a profile package which has been encrypted for a target eUICC. An ISD-R (issuer security domain—root) is a function in a eUICC responsible for the creation of new ISD-Ps on the eUICC. An ECASD (embedded UICC controlling authority security domain) provides secure storage of credentials required to support the security domains on an eUICC. A controlling authority security domain (CASD) may also be referred to as a "key store" herein. A security domain within the eUICC contains the operator's over the air (OTA) keys and provides a secure OTA channel. OTA keys are credentials used by an operator for remote management of operator profiles on an eUICC.

Some activities related to an eUICC resident in a device may be performed by the device. Examples of such activities are profile download assistance and local user interface functions. More information on profile download assistance and local user interface functions can be found in SGP.21.

Public Key Infrastructure Techniques

Communications of an eUICC may be authenticated using PKI techniques. The techniques disclosed herein are applicable to eUICCs, UICCs, and SEs. Certificates used for authentication and confidentiality purposes can be generated by a trusted certificate issuer (CI or root CA). A public-key certificate may also be referred to herein simply as a certificate.

A user may store a copy of a certificate, where the certificate holds the name of a given party (user identity). The public key recorded in the certificate can be used to check the signature on a message signed using a PKI private key of the given party. A user or message recipient may use an on-line protocol such as on-line certificate status protocol (OCSP) to determine if a certificate is valid. Examples of PKI techniques used for security are given in SGP.21.

The eUICC operating system can include ability to provide authentication algorithms to network access applications associated with a given operator. The operating system also can include the ability to translate profile package data into an installed profile using a specific internal format of the eUICC. An ECASD provides secure storage of credentials required to support the security domains on the eUICC. A controlling authority security domain (CASD) may also be referred to as a "key store" herein.

System

FIG. 1 illustrates an exemplary system for determining an eSIM type to be used in provisioning an SE 102 of a device 110 in a system 100. The SE 102 is able to communicate with an eSIM delivery server (also referred to as SM-DP+ or as an eSIM server) 150 over an interface 152, with an OEM server 140 over an interface 142, and with a carrier server 130 over an interface 132. As shown in FIG. 1, the device OS 111 of the device 110 can also communicate with these network entities over interfaces 151, 141, and 131, respectively. The OEM server 140 is associated with a device manufacturer. The carrier server 130 is associated with a wireless operator. The eSIM delivery server 150 may be operated by a third party. The OEM server may additionally communicate with a backend server 160 over an interface 163. The device OS 111, in some embodiments, makes use of a key store 113 for cryptographic operations. Certificates used for authentication and confidentiality purposes in the system 100 can be generated by a trusted certificate issuer, CI (not shown).

As described in more detail below, the OEM server 140, in some embodiments, obtains information about the device 110 and the SE 102 to determine eSIM types that are eligible for deployment to the device.

The device 110 includes a user interface 119. The user interface 119 may include a keypad and display screen, for example. The user interface 119 is for use by an end user 120. The device 110, in some embodiments is a smart phone or a wireless computing device such as a tablet. A wireless operator can provide services to the end user 120. The eSIM delivery server 150 provides profile packages (eSIMs for installation) to SE 102. The SE 102 includes an SE OS 101 and a key store ECASD 103. In some embodiments, the SE 102 uses the ECASD when performing cryptographic operations. Further details of eSIM installation can be found in SGP.21.

Message Flow

Figure 2A:
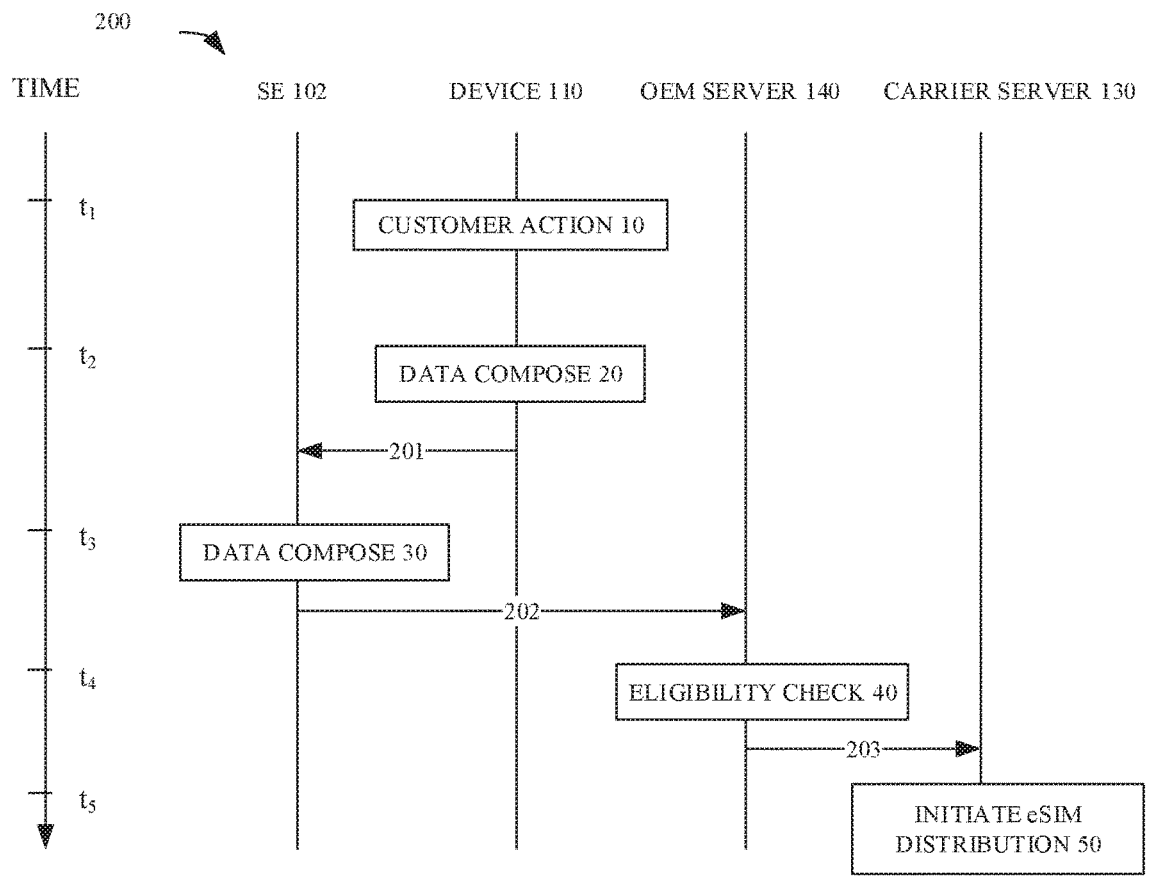
FIG. 2A illustrates an exemplary message flow in the system of FIG. 1.

FIG. 2A provides an overview of a device-centric eligibility check performed by the OEM server 140. FIG. 2A is a message flow diagram, with time advancing from top to bottom. Communicating entities are labelled across the top of FIG. 2A. Each entity is associated with a vertical line indicating the message origination or termination and boxes indicating events or actions that happen at the corresponding entity. The message flow originates at the device 110 when a customer makes a request that requires the installation of a new eSIM into the SE 102. In some embodiments, the request is for a wireless service from a wireless carrier associated with the carrier server 130. The wireless service, in some embodiments, is a new carrier plan. Examples of carrier plans are voice plans, data plans, or voice and data plans. This event is indicated as Customer Action 10 at a time $t_1$.

Figure 2B:
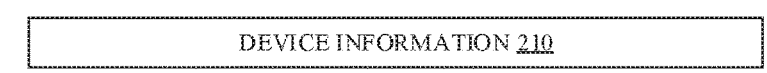
FIG. 2B illustrates exemplary device information.

At a time $t_2$, shortly after $t_1$, the device 110 composes a message (see Data Compose 20) including device information 210 in a payload (see FIG. 2B) and sends it to the SE 102 as a message 201. The device information 210 includes, in some embodiments, a device serial number, an IMEI, an MEID, a device hardware type, and/or a device version number.

Figure 2C:
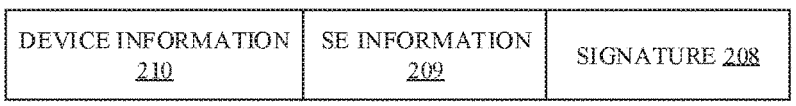
FIG. 2C illustrates an exemplary message including a signature.
Figure 2D:
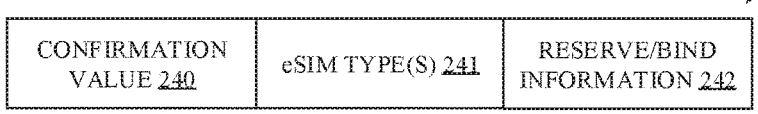
FIG. 2D illustrates an exemplary message sent from an OEM server to a carrier server.
Figure 2E:
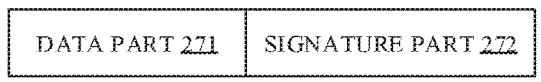
FIG. 2E illustrates a generic signed message, according to some embodiments.

In response to the message 201, the SE 102 collects information 209 about the SE, e.g., a table of installed eSIMs, EID, SE version, and/or SE OS version. In some embodiments, an EID is a concatenation of a Security Domain Provider Identification Number and a Security Domain Image Number. The information 209, in some embodiments, includes policy information stored on the SE 102, and resource information of the SE 102. The resource information includes, in some embodiments, non-volatile (NV) memory space size of the SE 102, and/or volatile (random access memory—RAM) memory space size. At a time $t_3$, The SE 102 composes a message payload based on the device information 210 and the SE information 209. The SE cryptographically signs over the message payload to create a signature 208 (activities indicated as the action Data Compose 30 in FIG. 2A) to create a message 202. A representation of the message 202 is shown in FIG. 2C. FIG. 2E is a message format 270 of a signed message. A signed message includes a data part 271 and a signature part 272. The signature part is generated by PKI techniques. Message 202 is an instance of a signed message. The message 202 is sent to the OEM server 140 via the device 110.

The OEM server 140 receives the message 202. At a time $t_4$, the OEM server 140 performs Eligibility Check 40. The OEM server 140 first evaluates the signature 208 to see if the sender is a legitimate SE. This evaluation can an include authentication using PKI techniques. Then the OEM server 140 reads the device information 210 and/or the SE information 209. If the device 110 is under a subsidy lock that will not allow the device 110 to fulfill the customer request of customer action 10, then the OEM server 140 will inform the carrier server 130 that the carrier server 130 should not proceed to install an eSIM on the SE 102 of the device 110. Without this check, an eSIM of an improper type could be deployed to the SE 102 of the device 110. The improper eSIM would not function, the eSIM would be wasted and the end user 120 could be irritated.

The OEM server 140 also, in some embodiments, relies on business rules to determine an eligible eSIM type. A business rule can stipulate that, if the device 110 is under a subsidy lock, a particular set of eSIM types are eligible for installation on the SE in the device. In this example, the existing subsidy lock does not conflict with the customer request. The particular set of eSIM types, in some embodiments, is associated with the wireless carrier through whom the phone was sold to an end user with the subsidy lock contract provision. The set, in some embodiments, is made up of a single eSIM type.

In some embodiments, the OEM server 140 determines, at the time $t_4$, eligible eSIM types based on the device information 210 and/or the SE information 209. The OEM server sends a message 203 to the carrier server 130. In some embodiments, the message 203 includes information as illustrated in FIG. 2D. FIG. 2D illustrates message 203 comprising a confirmation value 240, an indication of one or more eSIM types 241, and reserve/bind information 242. The confirmation value 240 is of a binary nature and indicates to proceed or to not proceed with complying with the customer request of customer action 10. In some embodiments, an indication to proceed will result in a deployment of an eSIM to the SE 102 of the device 110. The eSIM type(s) 241 are eligible eSIM types suitable for SE 102 on device 110. The reserve/bind information, in some alternative embodiments, is sent in one or more messages subsequent to the message 203. The reserve/bind information is used to reserve an eSIM from the eSIM delivery server 150 and associate it with the SE 102 on the device 110. The message components and formats of FIGS. 2B-2E are illustrative and not limiting. The carrier server 130, at a time $t_5$, then initiates deployment of an eSIM to the device 110. This is indicated generally in FIG. 2A as the action Initiate eSIM Distribution 50.

Eligibility Logic

Figure 3:
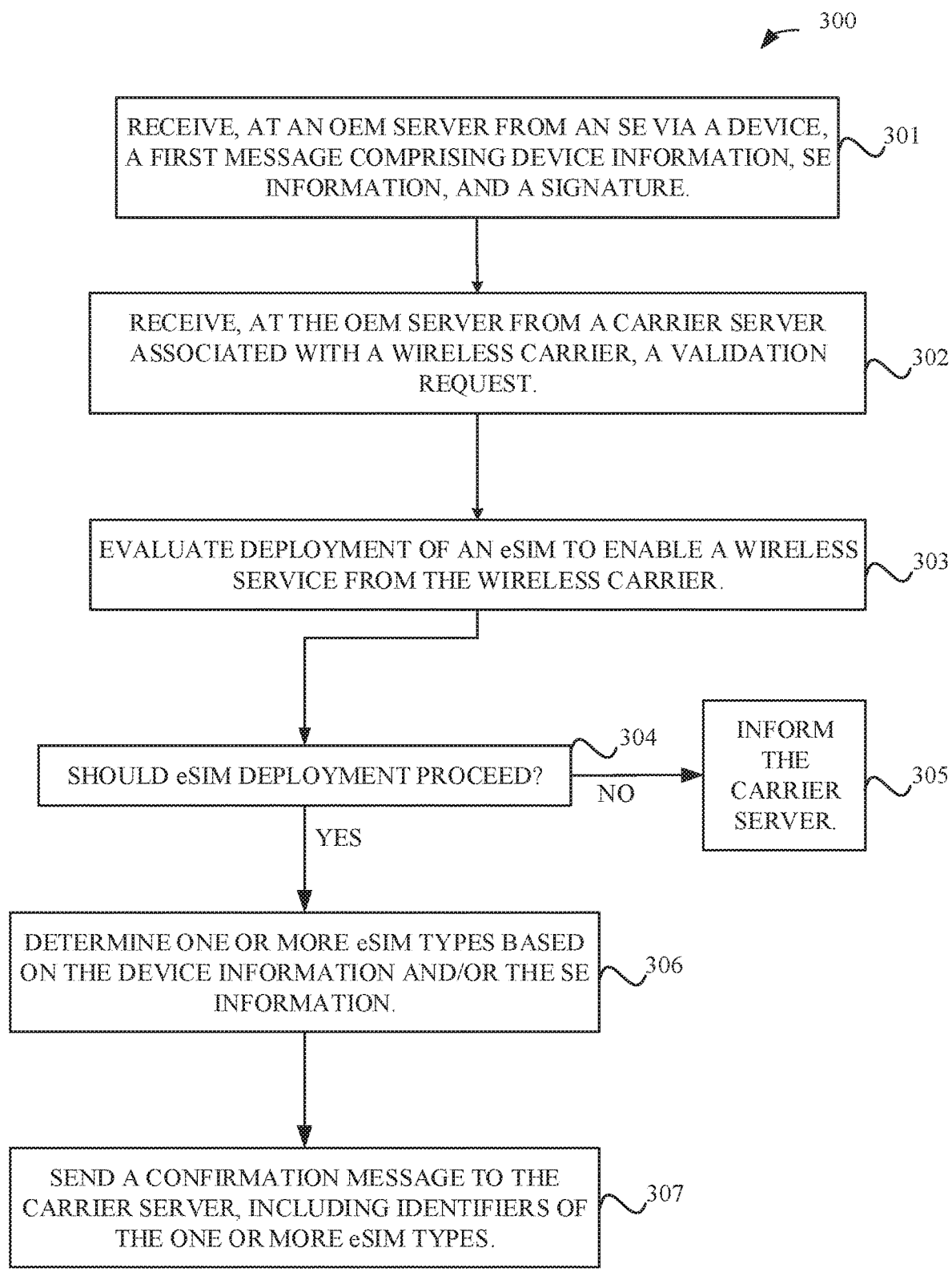
FIG. 3 illustrates exemplary logic for determining whether an eSIM deployment should proceed, according to some embodiments.

FIG. 3 illustrates exemplary logic for determining eSIM eligibility for an SE on a device. At 301, an OEM server receives a signed message comprising device information, SE information and a signature of the SE. The message originates at the SE and arrives at the OEM server via the device. At 302, the OEM server receives from a carrier server a validation request. As mentioned above, the carrier server is associated with a wireless carrier. In response to the validation request received at 302 and based on the device information and/or the SE information received at 301, at 303 the OEM server evaluates whether deployment of an eSIM to enable a wireless service from the wireless carrier should proceed. The logic reaches a decision point at 304; a negative result leads to informing the wireless carrier at 305 that eSIM deployment should not proceed. An affirmative result leads to 306. At 306, the OEM server determines one or more eSIM types based on the device information and/or the SE information. At 307, the OEM server sends a confirmation message with an affirmative value indicating the eSIM deployment should proceed and identifiers of one or more eSIM types that are eligible for deployment to the device for installation on the SE.

In one method provided herein an OEM server determines whether deployment of an eSIM to an SE in a device should proceed by: receiving a first message from the SE via the device, wherein the first message comprises i) device information, ii) SE information and iii) a signature; receiving a validation request from a carrier server associated with a wireless carrier, wherein the validation request is associated with a handoff token; determining whether deployment of an eSIM to enable a wireless service from the wireless carrier should proceed; and when the deployment should proceed: i) determining an eSIM type based on the device information and/or the SE information, and ii) sending a confirmation message to the carrier server, wherein the confirmation message comprises an indication of the determined eSIM type.

SE Details

Figure 4:
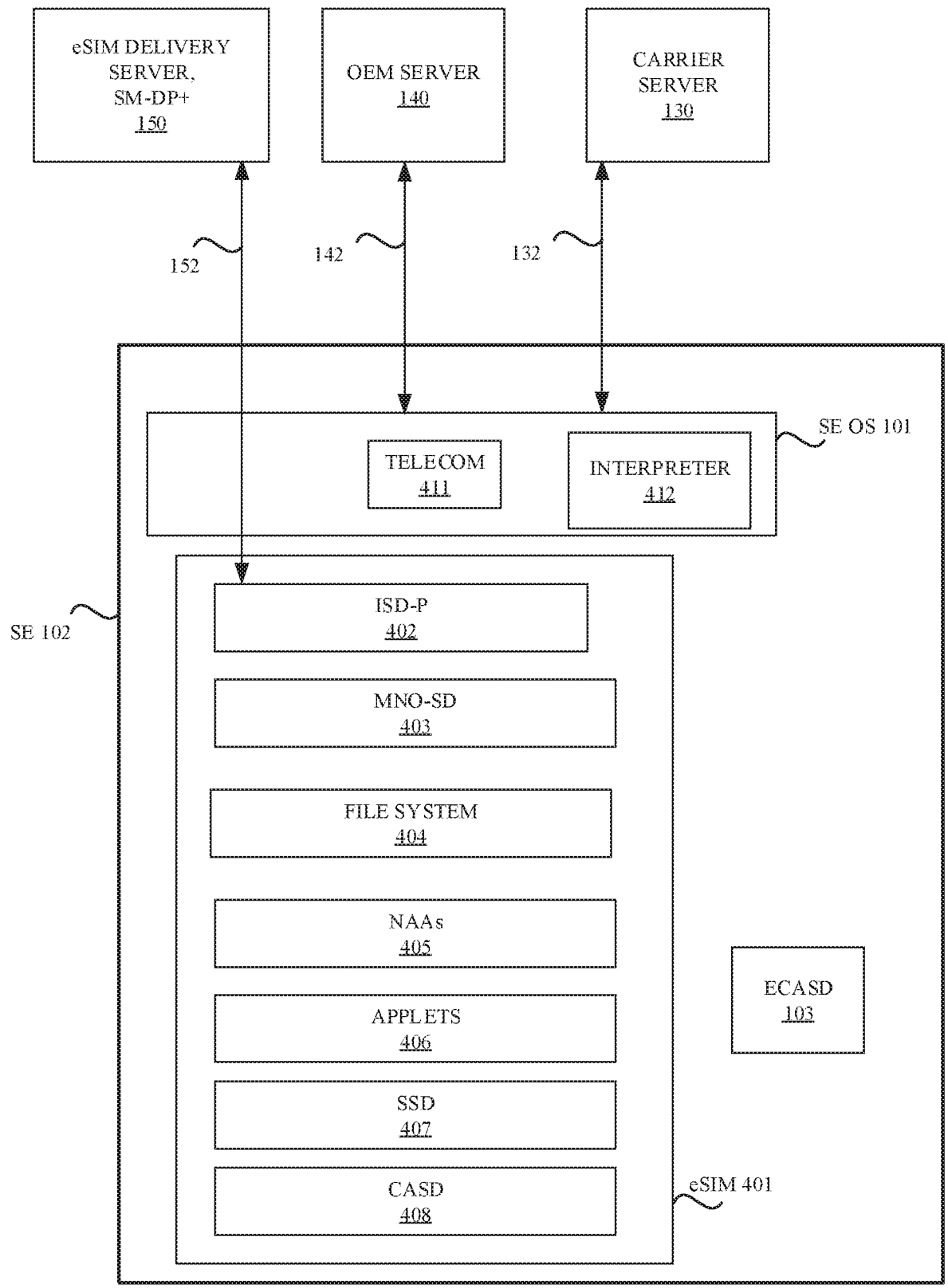
FIG. 4 illustrates an exemplary SE in communication with various network entities, according to some embodiments.

FIG. 4 illustrates a system 400 with details of the SE 102 including an eSIM 401. The SE 102 is housed within the device 110 as shown in FIG. 1. FIG. 4 does not show the device 110 for simplicity. After the carrier server 130 receives the message 203, the eSIM 401 is deployed to the device 110. Further details of eSIM deployment are provided in FIGS. 6A, 6B, and the accompanying description. The SE 102 includes the operating system 101. Within the operating system 101 is a telecom framework 411 which provides authentication algorithms to network access applications (such as NAAs 405). Interpreter 412 translates profile package data into an installed profile using a specific internal format of the SE 102. ISD-P 402 hosts the profile 401, i.e., the eSIM 401. The ISD-P is a secure container (security domain) for the hosting of the profile 401. The ISD-P is used for eSIM download and installation in collaboration with the interpreter 412 for the decoding of a received bound profile package. An issuer security domain (not shown) on the SE 102 is responsible for the creation of new ISD-Ps on the SE 102 and the lifecycle management of all ISD-Ps on the SE 102.

ECASD 103 provides secure storage of credentials required to support the security domains on SE 102. In some embodiments, an SE private key can be stored in ECASD 103 and used to sign over the payload of the message 202 shown in FIG. 2C to create an instance of the signature part 272. The OEM server 140 can use the SE public key corresponding to that SE private key to authenticate the received message 202. Together the SE public key and SE private key form a PKI public key—private key pair.

MNO-SD 403 is the representative on the SE 102 of the operator providing services via the eSIM 401 to the end user 120. The MNO-SD 403 contains the operator's OTA keys and provides a secure OTA channel. Further description of profile (eSIM) management in a consumer device can be found in SGP.21.

Example Device Connections

Figure 5:
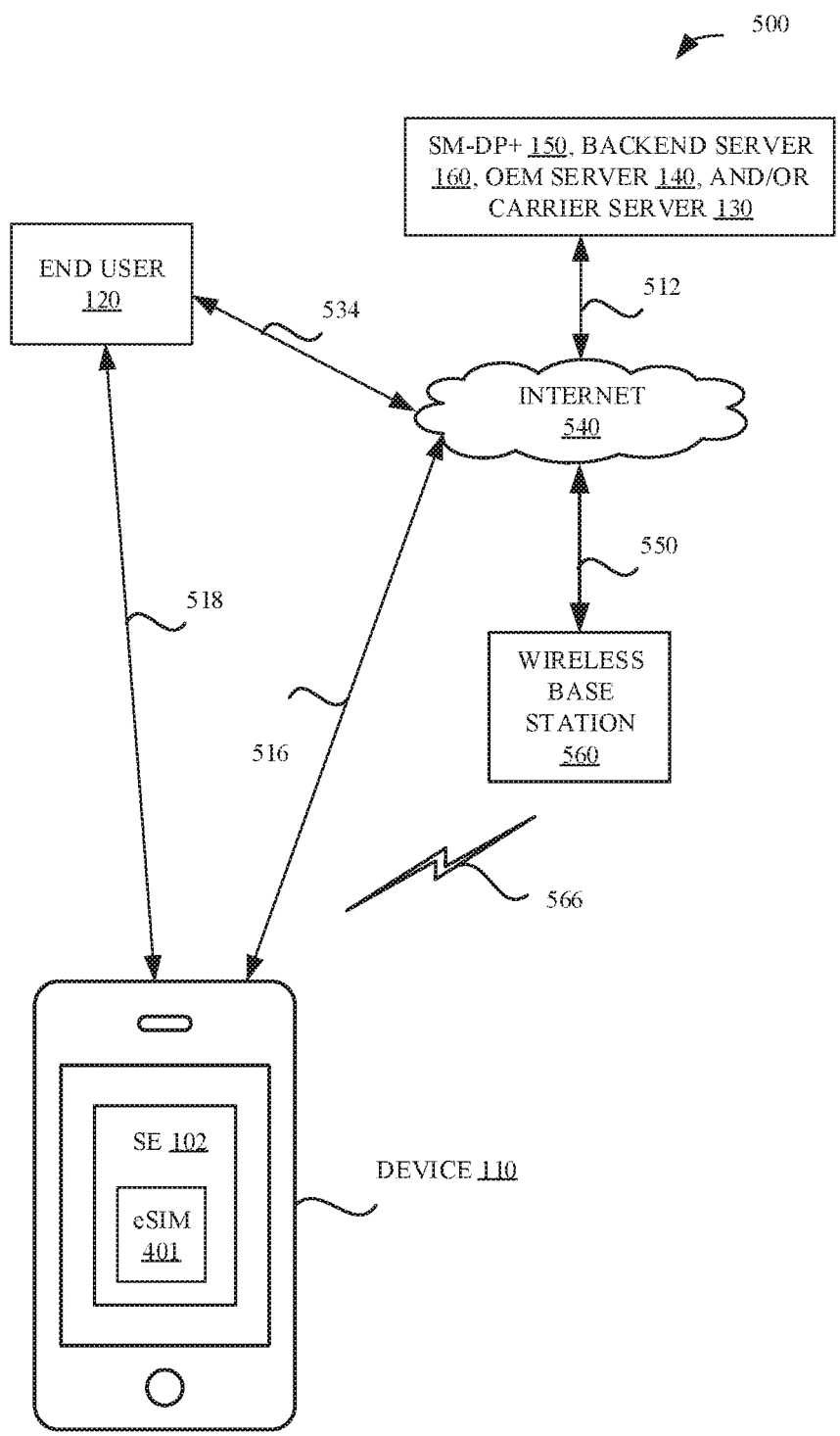
FIG. 5 illustrates the device and various network entities in communication via a wireless base station and/or the Internet, according to some embodiments.

FIG. 5 illustrates example connection methods for determining an eligible eSIM for deployment to the device 110 in a system 500. End user 120 can manage device 110 using interface 518 which can convey end user actions such as requesting a new carrier plan as described with respect to FIG. 2A. The end user 120 can also remotely manage device 110 via the Internet 540 using interface 534. The device 110 is shown connected to a wireless base station 560. The wireless base station 560 communicates with the device 110 via a wireless link 566. The wireless base station 560 can be an Institute of Electronic and Electrical Engineers 802.11 Wireless Fidelity (IEEE 802.11 Wi-Fi) access point (AP) or the wireless base station 560 can be, for example, a cellular mobile network base station. Examples of cellular mobile network base stations are a 2G or 3G base station or an LTE eNode B.

A number of servers are shown connected to the Internet 540 by a generic link 512. Link 512 represents a collection of links, including a link for each server to the Internet. The carrier server 130, in some embodiments, queries the OEM server 140 via the Internet 540 without depending on the device 110 being powered up. The OEM server 140, in some embodiments, places a second query to the backend server 160 to obtain information on which to base a reply to the carrier server. Device information associated with the device 110 can be considered private and not suitable to forward to the carrier server 130. The OEM server 140 performs evaluations based on the device information 210 (some of which is obtained, in some embodiments, from the backend server 160) and the SE information 209. After the evaluation, the OEM server 140 responds specifically to the query from the carrier server 130.

After deployment of the eSIM 401, the end user 120 can now enjoy their requested carrier plan or wireless service based on the eSIM 401. The eSIM 401 is compatible with the device 110 and the SE 102 based on the eligibility check performed by the OEM server 140.

Detailed Message Flow

Figure 6A:
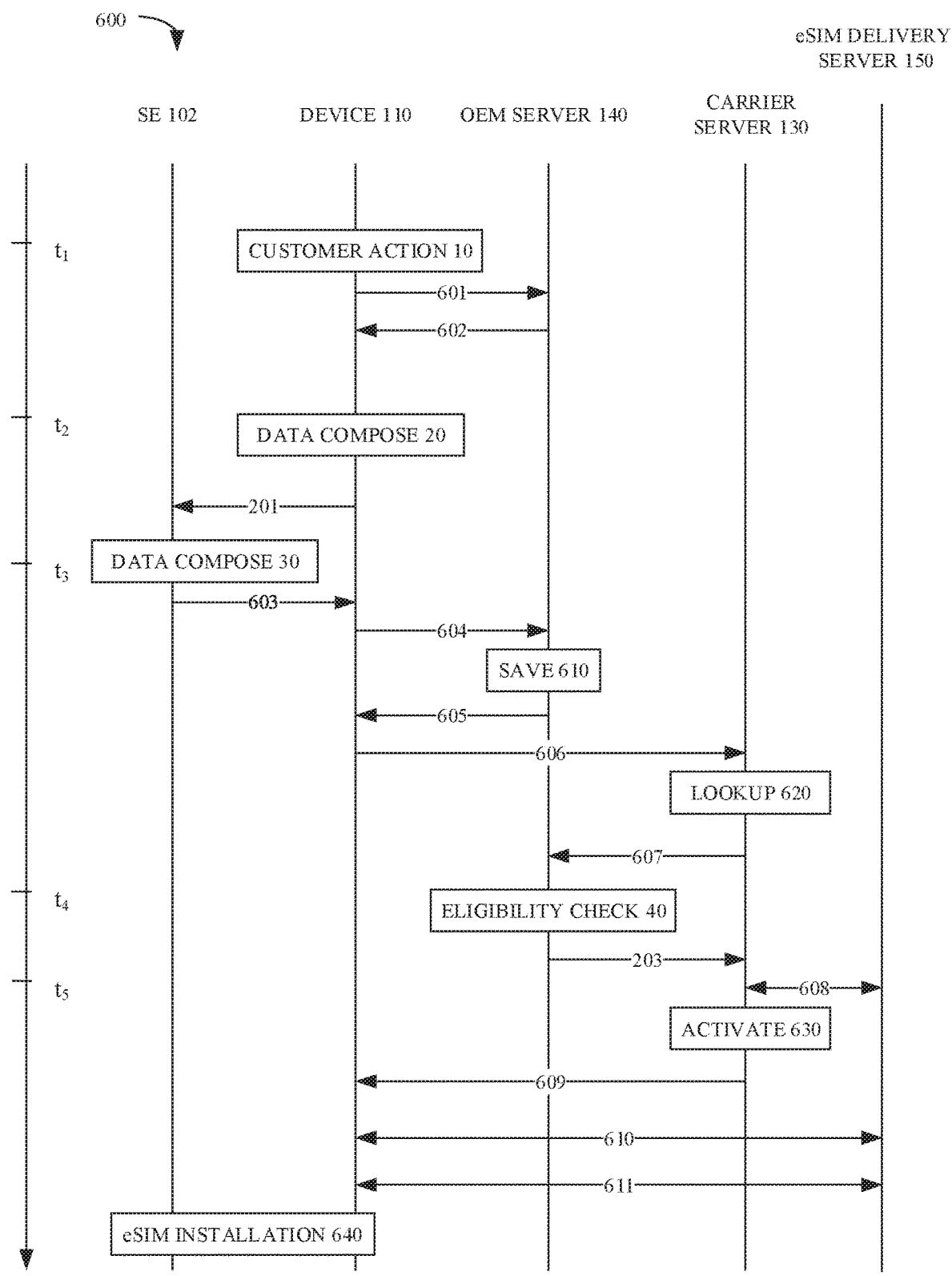
FIG. 6A is a version of the message flow of FIG. 2A with additional messages, actions and transactions, according to some embodiments.

FIG. 6A provides further details to the message flow introduced in FIG. 2A. Customer Action 10, Data Compose 20, message 201, Data Compose 30, Eligibility Check 40, and message 203 have the same meaning as in FIG. 2A. Message 601 initiates a session with the OEM server, and message 602 provides a session identifier to the device 110. The session identifier, in some embodiments, is a random number generated by the OEM server 140. The session identifier or session ID, in some embodiments, is included in the device information 210. The device 110 can authenticate the OEM server 140 using the transport layer security (TLS) protocol. Messages 603 and 604 represent the transmission of the message 202 from the SE 102 to the OEM server 140 via the device 110. The action denoted Save 610 indicates the OEM server checking the signature 208 on the message 202 and, when authentic, saving the device information 210 and the SE information 209 in OEM server 140 memory. The OEM server 140 then creates a handoff token (also referred to as a token) and sends the handoff token to the device 110 in the message 605.

The device 110 then sends the device information 210 and the SE information 209, along with the handoff token in the message 606. The message 606 can be routed, for example, using a carrier web site URL. The message 606, in some embodiments, is an HTTPS POST message. The message 606 then reaches the carrier server 130. In an action denoted Lookup 620, the carrier server 130 determines a network identifier or network address of the OEM server 140 based on the device information 210. The carrier server 130 then sends a validation request as message 607 to the OEM server 140. The OEM server 140 then performs an action denoted as Eligibility Check 40. The OEM server 140 then sends the message 203 to the carrier server 130. The subsequent messages are associated with a message 203 with a confirmation field holding a confirmation value 240 indicating that eSIM deployment should proceed. The confirmation value 240 to proceed may be a "1" or an "OK", for example. In the instance of the message 203 indicating that deployment of the eSIM is to proceed, the items denoted 608, 630, 609, 610, 611, and 640 occur beginning at the time $t_5$. The items beginning at the time $t_5$ are associated with the action Initiate eSIM Distribution 50 of FIG. 2A.

In particular, the carrier server 130 and the eSIM delivery server 150 perform eSIM operations. For example, reserve/bind eSIM operations as represented by the double-headed arrow 608. The carrier server 130 activates, for example, the requested carrier plan and associates it with an eSIM ICCID. The ICCID, for example, identifies the eSIM instance eSIM 401. Message 609 indicates the carrier server 130 triggering a monitor mode at the device 110. The monitor mode is a software program in the device that is initiated when an eSIM has been assigned. Some time may elapse between assignment of an eSIM and delivery of the eSIM to the device, the monitor mode alerts the device to expect an eSIM. Double-headed arrow 610 represents profile options being set before deployment of the eSIM. Double-headed arrow 611 represents the transaction of downloading the eSIM 401 to the device 110. The action eSIM Installation 640 represents the installation of the eSIM 401 on the SE 102 with the assistance of the device 110. The end user 120 can now enjoy the carrier services associated with the eSIM 401. Based on the Eligibility Check 40 performed by the OEM Server 140, resources of the eSIM delivery server 150 have not been wasted by deployment to an incompatible device and SE.

Logic for eSIM Download with OEM Server Eligibility Check

Figure 6B:
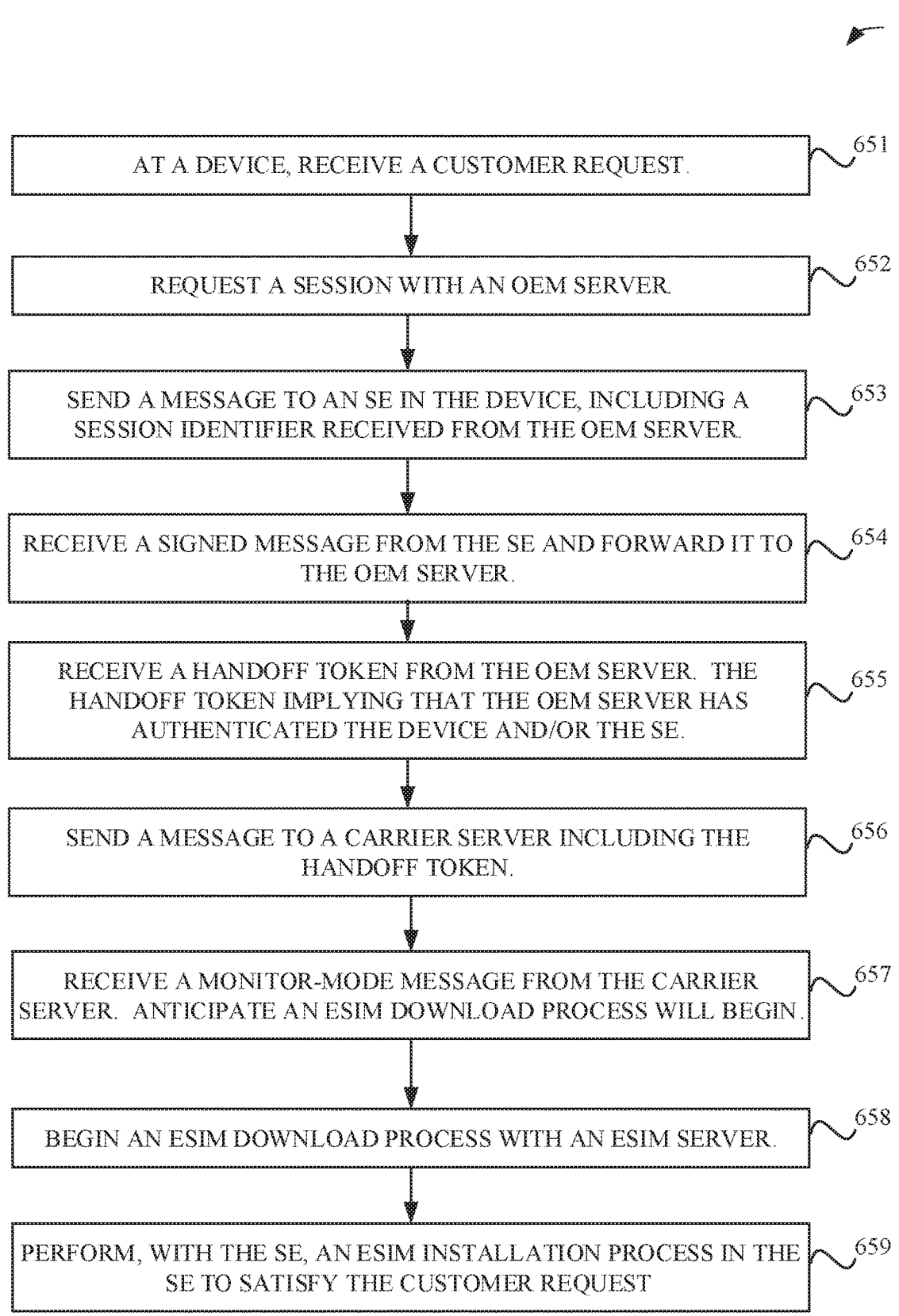
FIG. 6B provides exemplary logic for a device cooperating with an original equipment manufacturer (OEM) server to provide an eligible eSIM in response to a customer request, according to some embodiments.

FIG. 6B illustrates exemplary logic 650 for eSIM download based on an OEM server eligibility check. At 651, a device receives a customer request. In some embodiments, the request is received via a user interface. For example, based on a user of the device selecting a wireless service contract option from a graphic user interface (GUI). At 652, in response to the request, the user requests a session with an OEM server. At 653, after receiving a session identifier from the OEM server, the device sends a message to an SE embedded or housed or hosted in the device. This message, in some embodiments, includes the device IMEI, device serial number, device MEID, and/or version number of the operating system installed in the device. In some embodiments, the OEM server generates the session identifier as a pseudo-random number.

At 654, the device receives a signed message from the SE and forwards it to the OEM server. Inside the signed message, the SE has included SE information such as CSN/EID and/or identifiers of installed eSIMs (e.g., ICCID values). The signature on the signed message is created by the SE using an SE credential. For example, the SE credential can be a private key of a PKI public key—private key pair, where the public key is distributed widely or at least to parties that need to verify the SE signature. Examples of signature verification using PKI techniques are given in SGP.21.

At 655, the device receives a handoff token from the OEM server. The OEM server generates the handoff token after receiving the message signed by the SE and after authenticating the device and/or the SE. In some embodiments, the OEM server verifies the SE signature and the session identifier parsed from the received signed message. At 656, the device sends a message to a carrier server including the handoff token. The message sent to the carrier server, in some embodiments, is an HTTP POST message. The carrier server is a server operated by an MNO or on behalf of an MNO. The carrier server can determine an identity or address of the OEM server using device information in POST data parsed from the POST message. The carrier server, in some embodiments, queries the OEM server using the handoff token to determine whether the device is eligible for an eSIM corresponding to the requested service.

The OEM server, in some embodiments, uses a backend server operated by the OEM to determine whether the SE is eligible for an eSIM suitable for the requested service or service contract. The OEM backend server, in some embodiments, stores or provides factory feed information and/or shipping information associated with a device and the SE in the device. Based on the data from the OEM backend server, the OEM server may determine, in some instances, that an activation policy of the requesting device does not allow installation of an eSIM related to the requested service or contract. Business rules, in some embodiments, are a basis for the eligibility check done by the OEM server. In the example of FIG. 6B, the device is eligible and an eSIM download operation will occur.

At 657, the device receives a monitor-mode message from the carrier server. A monitor-mode message informs the device to expect an eSIM download operation. The carrier server communicates with an eSIM delivery server (not shown in the logic of FIG. 6B). At 658, the device begins an eSIM download process with the eSIM delivery server. At 659, the device begins an eSIM installation process with the SE to satisfy the customer request. Further details of eSIM installation can be found in SGP.21.

Overall Wireless Technologies

Wireless devices, and mobile devices in particular, can incorporate multiple different radio access technologies (RATs) to provide connections through different wireless networks that offer different services and/or capabilities. A wireless device can include hardware and software to support a wireless personal area network ("WPAN") according to a WPAN communication protocol, such as those standardized by the Bluetooth® special interest group ("SIG") and/or those developed by Apple referred to as an Apple Wireless Direct Link (AWDL). The wireless device can discover compatible peripheral wireless devices and can establish connections to these peripheral wireless devices located in order to provide specific communication services through a WPAN. In some situations, the wireless device can act as a communications hub that provides access to a wireless local area network ("WLAN") and/or to a wireless wide area network ("WWAN") to a wide variety of services that can be supported by various applications executing on the wireless device. Thus, communication capability for an accessory wireless device, e.g., without and/or not configured for WWAN communication, can be extended using a local WPAN (or WLAN) connection to a companion wireless device that provides a WWAN connection. Alternatively, the accessory wireless device can also include wireless circuitry for a WLAN connection and can originate and/or terminate connections via a WLAN connection. Whether to use a direct connection or a relayed connection can depend on performance characteristics of one or more links of an active communication session between the accessory wireless device and a remote device. Fewer links (or hops) can provide for lower latency, and thus a direct connection can be preferred; however, unlike a legacy circuit-switched connection that provides a dedicated link, the direct connection via a WLAN can share bandwidth with other wireless devices on the same WLAN and/or with the backhaul connection from the access point that manages the WLAN. When performance on the local WLAN connection link and/or on the backhaul connection degrades, a relayed connection via a companion wireless device can be preferred. By monitoring performance of an active communication session and availability and capabilities of associated wireless devices (such as proximity to a companion wireless device), an accessory wireless device can request transfer of an active communication session between a direction connection and a relayed connection or vice versa.

In accordance with various embodiments described herein, the terms "wireless communication device," "wireless device," "mobile device," "mobile station," "wireless station", "wireless access point", "station", "access point" and "user equipment" (UE) may be used herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) LTE, LTE Advanced (LTE-A), and/or 5G or other present or future developed advanced cellular wireless networks.

The wireless device, in some embodiments, can also operate as part of a wireless communication system, which can include a set of client devices, which can also be referred to as stations, client wireless devices, or client wireless devices, interconnected to an access point (AP), e.g., as part of a WLAN, and/or to each other, e.g., as part of a WPAN and/or an "ad hoc" wireless network, such as a Wi-Fi direct connection. In some embodiments, the client device can be any wireless device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; IEEE 802.11ax; or other present or future developed IEEE 802.11 technologies.

Additionally, it should be understood that the wireless devices described herein may be configured as multi-mode wireless communication devices that are also capable of communicating via different third generation (3G) and/or second generation (2G) RATs. In these scenarios, a multi-mode wireless device or UE can be configured to prefer attachment to LTE networks offering faster data rate throughput, as compared to other 3G legacy networks offering lower data rate throughputs. For instance, in some implementations, a multi-mode wireless device or UE may be configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

Representative Exemplary Apparatus

Figure 7:
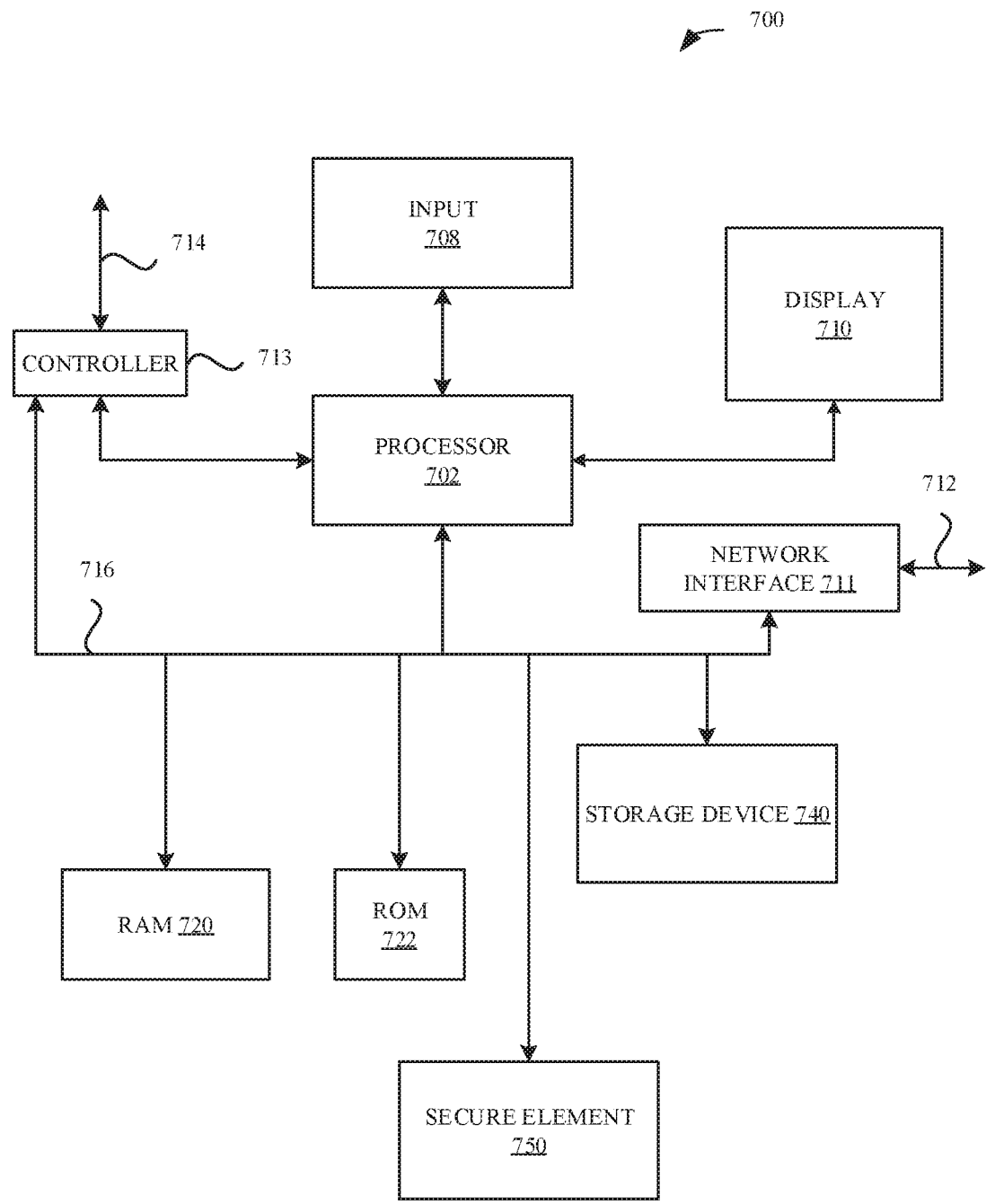
FIG. 7 illustrates an exemplary apparatus for implementation of the embodiments disclosed herein, according to some embodiments.

FIG. 7 illustrates in block diagram format an exemplary computing device 700 that can be used to implement the various components and techniques described herein, according to some embodiments. In particular, the detailed view of the exemplary computing device 700 illustrates various components that can be included in the device 110, the SE 102, and the OEM server 140 illustrated in FIGS. 1, 2A, 4, 5, and 6A. As shown in FIG. 7, the computing device 700 can include a processor 702 that represents a microprocessor or controller for controlling the overall operation of computing device 700. The computing device 700 can also include a user input device 708 that allows a user of the computing device 700 to interact with the computing device 700. For example, the user input device 708 can take a variety of forms, such as a button, keypad, dial, touch screen, audio input interface, visual/image capture input interface, input in the form of sensor data, etc. Still further, the computing device 700 can include a display 710 (screen display) that can be controlled by the processor 702 to display information to the user (for example, information relating to incoming, outgoing, or active communication session). A data bus 716 can facilitate data transfer between at least a storage device 740, the processor 702, and a controller 713. The controller 713 can be used to interface with and control different equipment through an equipment control bus 714. The computing device 700 can also include a network/bus interface 711 that couples to a data link 712. In the case of a wireless connection, the network/bus interface 711 can include wireless circuitry, such as a wireless transceiver and/or baseband processor. The computing device also includes a secure element 750. In some embodiments, the secure element 750 is an eUICC.

The computing device 700 also includes a storage device 740, which can comprise a single storage or a plurality of storages (e.g., hard drives), and includes a storage management module that manages one or more partitions within the storage device 740. In some embodiments, storage device 740 can include flash memory, semiconductor (solid state) memory or the like. The computing device 700 can also include a Random Access Memory ("RAM") 720 and a Read-Only Memory ("ROM") 722. The ROM 722 can store programs, utilities or processes to be executed in a non-volatile manner. The RAM 720 can provide volatile data storage, and stores instructions related to the operation of the computing device 700.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, hard storage drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A wireless device comprising:
   a wireless transceiver;
   a memory; and
   one or more processors, wherein the memory includes instructions that when executed by a processor of the one or more processors, cause the wireless device to perform operations comprising:
   forming a first payload, wherein the first payload comprises device information that characterizes the wireless device,
   sending the first payload to a secure element (SE) included in the device,
   receiving a signed message from the SE, wherein the signed message includes the device information and SE information that characterizes the SE,
   forwarding the signed message, via the wireless transceiver, to an original equipment manufacturer (OEM) server,
   receiving, via the wireless transceiver, a transaction identifier from the OEM server,
   sending, via the wireless transceiver, a second message to a carrier server, wherein the second message comprises the transaction identifier, and
   receiving, via the wireless transceiver, an electronic subscriber identity module (eSIM) from an eSIM delivery server contacted by the carrier server, wherein an eSIM type of the eSIM is based on the device information and the SE information.

2. The wireless device of claim 1, further comprising a user interface, wherein the forming a first payload is responsive to a customer request received by the wireless device via the user interface.

3. The wireless device of claim 1, wherein the device information that characterizes the wireless device comprises one or more of a device identifier, a hardware type, or a device version number.

4. The wireless device of claim 1, wherein the wireless device is a wireless tablet computing device.

5. The wireless device of claim 1, wherein the wireless device is a smart phone.

6. The wireless device of claim 1, wherein the SE is an embedded universal integrated circuit card (eUICC).

7. The wireless device of claim 1, wherein the SE information that characterizes the SE comprises one or more of: a listing of eSIMs currently installed on the SE, policy information currently stored on the SE, SE resource information, SE non-volatile (NV) memory space size, SE volatile (RAM) memory space size, an electronic identifier (EID), or SE version information including an operation system version identifier.

8. The wireless device of claim 7, wherein the EID is a concatenation of a Security Domain Provider Identification Number and a Security Domain Image Number.

9. A method comprising:
by a wireless device:
receiving a customer request;
requesting a session with an original equipment manufacturer (OEM) server;
receiving a session identifier from the OEM server;
forming a first payload, wherein the first payload comprises wireless device information that characterizes the wireless device;
sending the first payload to a secure element (SE) housed in the wireless device;
receiving a signed message from the SE, wherein the signed message comprises the first payload and a second payload, and wherein the second payload comprises SE information that characterizes the SE;
forwarding the signed message to the OEM server;
receiving a handoff token from the OEM server;
sending a redirect message to a carrier server, wherein the redirect message comprises the handoff token; and
receiving an electronic subscriber identity module (eSIM) from an eSIM delivery server contacted by the carrier server, wherein an eSIM type of the eSIM is based on the wireless device information and the SE information.

10. The method of claim 9, wherein the customer request is associated with a request to sign up for contract services with a wireless carrier.

11. The method of claim 9, wherein requesting a session comprises:
authenticating the OEM server using a transport layer security (TLS) protocol.

12. A method comprising:
by an original equipment manufacturer (OEM) server:
receiving a session request from a wireless device;
sending a session identifier to the wireless device;
receiving a signed message from a secure element (SE) via the wireless device, wherein the signed message comprises i) wireless device information that characterizes the wireless device, ii) SE information that characterizes the SE and iii) a signature;
storing the wireless device information and the SE information in a memory of the OEM server;
sending a handoff token to the wireless device;
receiving a validation request from a carrier server associated with a wireless carrier, wherein the validation request is associated with the handoff token;
determining whether a deployment of an electronic subscriber identity module (eSIM) to enable a wireless service from the wireless carrier should proceed;
when the deployment should not proceed:
sending a termination message to the carrier server; and
when the deployment should proceed:
determining an eSIM type based on the wireless device information and the SE information, and
sending a confirmation message to the carrier server, wherein the confirmation message comprises an indication of the eSIM type of the eSIM to download to the wireless device.

13. The method of claim 12, wherein the signed message comprises a received session identifier, the method further comprising:
verifying that the received session identifier matches the session identifier; and
authenticating the signature using a public key of the SE.

14. The method of claim 12, wherein the determining the eSIM type further comprises:
determining the eSIM type based on an SE operating system (OS) version number, wherein the SE OS version number is included in the SE information.

15. The method of claim 12, wherein the determining the eSIM type further comprises:
determining the eSIM type based on a type of SE installed in the wireless device, wherein the type of SE is included in the wireless device information.

16. The method of claim 12, wherein the determining the eSIM type further comprises:
determining the eSIM type based on a wireless device type, wherein the wireless device type is included in the wireless device information.

17. The method of claim 12, wherein the determining the eSIM type further comprises:
determining the eSIM type based on an SE policy.

18. The method of claim 17, wherein the SE policy indicates that: i) the SE is configured with a subsidy lock, and ii) the eSIM type is limited to a set of eSIM types, wherein the set of eSIM types is associated with the subsidy lock.

19. The method of claim 12, wherein the determining whether the deployment should proceed comprises:
requesting second wireless device information from a database, wherein the database comprises factory information and/or distribution information; and
determining whether the deployment should proceed based on the factory information, the distribution information, and/or business rules.

20. The method of claim 19, wherein the distribution information indicates whether the wireless device was sold under a subsidy lock contract.

* * * * *